United States Patent [19]

Dixie

[11] 4,246,944
[45] Jan. 27, 1981

[54] HARVESTING BAG

[76] Inventor: Grahame B. R. Dixie, 24 Villiers St., Leamington Spa, Warwickshire, England

[21] Appl. No.: 965,043

[22] Filed: Nov. 30, 1978

[30] Foreign Application Priority Data

Dec. 2, 1977 [GB] United Kingdom ............... 50277/77

[51] Int. Cl.³ .................................... A01D 46/22
[52] U.S. Cl. ........................................ 150/2; 193/7; 224/217
[58] Field of Search .................... 150/2; 224/217, 218, 224/219, 220, 222, 267; 193/7

[56] References Cited

U.S. PATENT DOCUMENTS

| 1,143,512 | 6/1915 | Cruson | 150/2 |
| 1,583,041 | 5/1926 | Herrick | 150/2 |
| 1,640,004 | 8/1927 | Lundblad | 224/217 |
| 1,715,111 | 5/1929 | Younie | 193/7 |
| 1,719,641 | 7/1929 | Abrahamson | 224/217 |
| 2,764,328 | 9/1956 | Popp | 224/217 |
| 3,326,345 | 6/1967 | Staffend | 150/2 X |

FOREIGN PATENT DOCUMENTS 803127 10/1958 United Kingdom .

*Primary Examiner*—Donald F. Norton
*Attorney, Agent, or Firm*—Schuyler, Banner, Birch, McKie & Beckett

[57] ABSTRACT

A harvesting aid in the form of a bag or tubular chute having frame means to maintain its entrance in an open condition and hand hold means operable, in use, to engage a portion of a harvester's hand while leaving the fingers free to move at the entrance.

30 Claims, 6 Drawing Figures

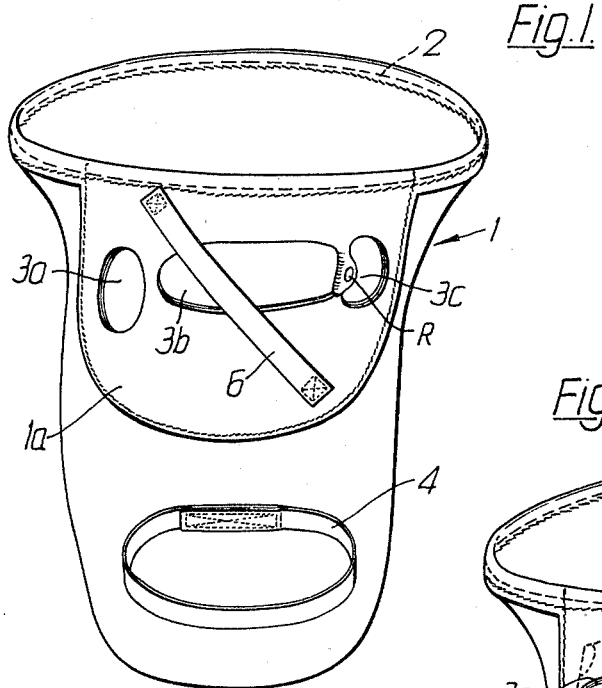
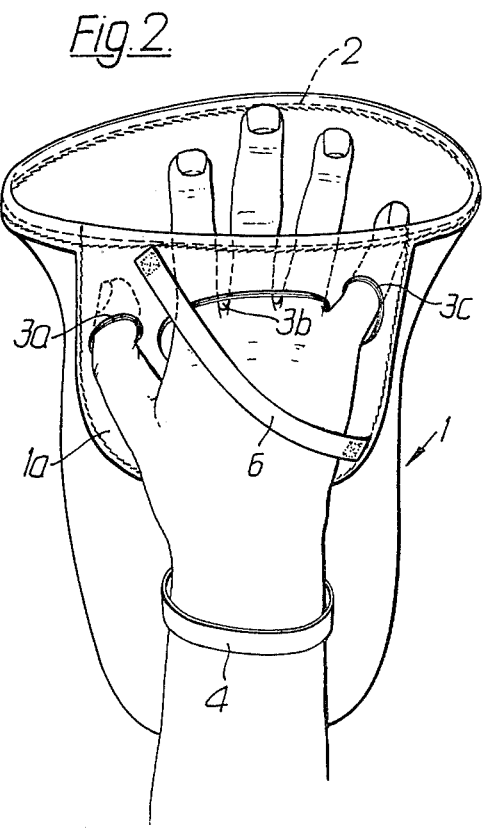

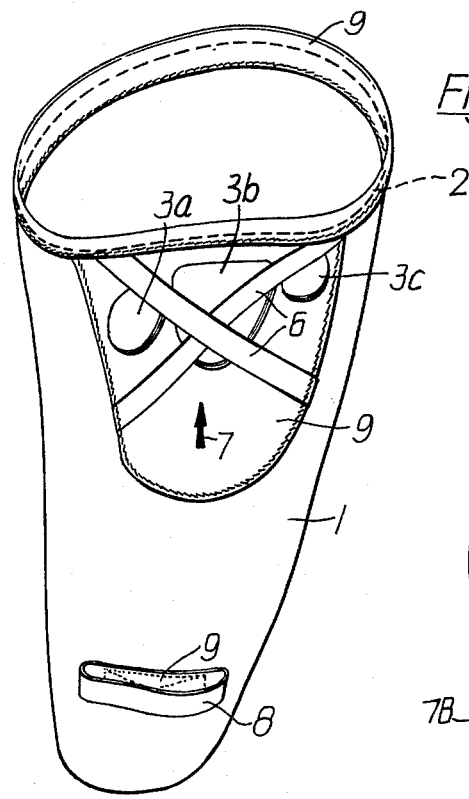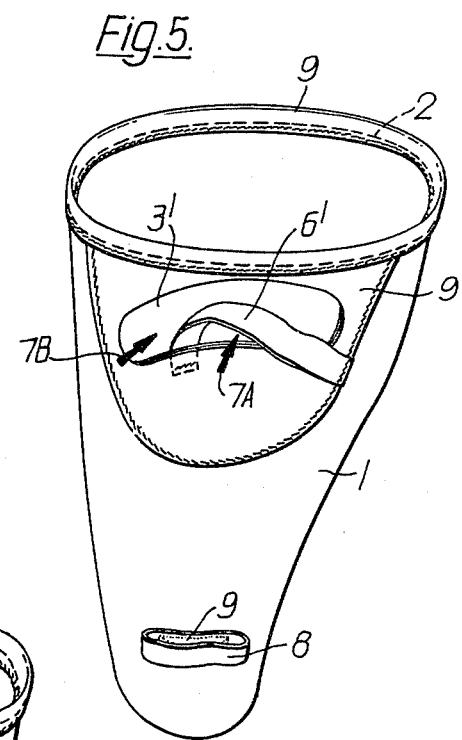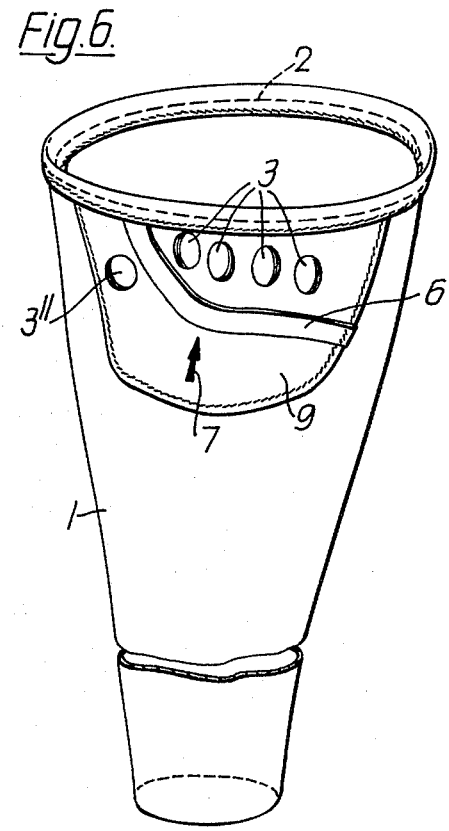

HARVESTING BAG

This invention relates to a harvesting aid in the form of a bag or chute for use particularly in picking soft fruit, top fruit, nuts and berries.

In a conventional non-mechanical method of picking soft fruit from bushes, such as blackberries, raspberries and gooseberries, the fruit picker picks with one hand and transfers fruit to the other hand which functions as a temporary store. When this other hand is full, the picker leaves the bush and transfers the fruit to a main collection bag sited some way from the bush.

This method is unsuitable for rapid picking for several reasons. Firstly, the treks backwards and forwards between the bush being harvested and the main storage bag are time consuming. Secondly the hand makes a very inferior store because its capacity is small and therefore picking has to be consistently interrupted in order to empty the hand. Thirdly, the hand has to be cupped in order to function as a store at all and cupping is difficult for the picker if he is reaching to collect fruit from high up on a bush. Fourthly, fruit can be easily dropped during the act of picking or subsequently in its transfer to the temporary storage hand.

Throughout the specification the term "fingers" is to be interpreted as encompassing fingers and thumbs.

According to the invention, there is provided a harvesting aid in the form of a bag or tubular chute having frame means to maintain its entrance in an open condition and hand hold means operable, in use, to engage a portion of a harvester's hand while leaving the fingers free to move at the entrance.

The hand hold means can comprise an array of holes in a side of the bag or chute near the entrance. In use the harvester's fingers are inserted through the holes from the outside of the bag or chute so that the bag or chute hangs from the base of the inserted fingers. Preferably there are three holes, one for the thumb, one the for little finger and a laterally elongated hole for the remaining fingers. In such a case, the portion of the bag between the hole for the little finger and the elongated hole is folded to reduce the likelihood of that portion cutting into the skin of the users fingers during use. The hand hold means may further include one or more straps, preferably elasticated straps, arranged to operate in conjunction with the hole or holes and to grip the hand.

More specifically the hand hold means may comprise an array of holes for the fingers in a side of the bag or chute near the entrance, and a strap on the outside of the bag or chute extending from a portion of the bag or chute between either the right-hand hole or left-hand hole of the array of holes and the entrance, diagonally across the array of holes to a portion of the bag below either the left-hand hole or the right-hand hole, respectively.

In this case the hand hold means may further include a second strap extending across the array of holes in a direction diagonally opposite to this first strap.

In another specific alternative, the hand hold means may comprise a single laterally-elongated hole for all five fingers and a strap extending from a portion of the outside of the bag or chute below either the right-hand or the left-hand end of the hole through the hole to a position on the inside of the bag or chute below either the left-hand or the right-hand end of the hole, respectively.

Alternatively, the hand hold means may simply comprise an elasticated strap attached at both its ends to the bag or chute in the vicinity of the entrance, or an elasticated sleeve secured to the outside of the bag or chute, as by stitching. In this latter case, the harvester's hand is placed into the sleeve and is gripped at the base of the fingers.

In the above alternatives, the harvester's arm is in use located outside the bag or chute, but in another possible embodiment the arm passes into the bag or chute through a hole at the bottom, and hand hold means is provided on the inside of the bag near its entrance, to hold the rim of the bag against the hand. In this case the hole at the bottom must be a tight fit around the arm to prevent fruit from escaping through the hole and for this purpose elastic may be provided around the hole.

The harvesting bag or chute is preferably made of canvas, tough plastics or the like in order to combat the effect of thorns which are common to fruit bushes.

The frame means can comprise a bent length of wire or semi-rigid plastics secured to the top of the bag or chute, e.g. by stitching into a fold of the bag or chute material. The wire is preferably bent to a generally circular form.

One form of bag or chute is dimensioned to extend along the length of the harvester's forearm and to hand next to his forearm in use. Spaced from the entrance, such a bag can have means for fixing the bag to the harvester's arm. For example, said means may be a single elasticated strap or a pair of straps arranged to be fastened together around the wrist or forearm, for which purpose each may have a Velcro (RTM) tab.

A tubular chute according to the invention is intended in use to feed the harvested fruit into a larger storage bag. The chute has an entrance as previously defined, and is adapted, for example, by straps, to be attached to the harvester's person and to feed into a large storage bag which the harvester hangs from his shoulders. Such a storage bag can function as a main collection bag mentioned in connection with the prior art.

For picking soft fruit which can be easily bruised if handled roughly the harvesting bag or chute can have a lining of padding, for example cotton wool, separating an outer layer of for example canvas or stiff plastics from an inner layer of, for example, polyethylene.

Embodiments of the invention will now be described by way of example with reference to the accompanying drawings in which:

FIG. 1 is a perspective view of a harvesting bag according to the invention;

FIG. 2 is a perspective view of the harvesting bag when attached to a harvester's arm and ready for use;

FIG. 3 is a perspective view of the harvesting bag in use;

FIGS. 4 and 5 are perspective views of two further harvesting bags according to the invention; and FIG. 6 is a perspective view of a harvesting chute according to the invention.

In the various figures corresponding parts have the same reference numerals.

Referring in detail to FIG. 1, harvesting bag 1 is shown having its entrance held open by a frame 2 comprising a length of wire bent roughly circular and stitched into the upper end of the bag. The bag is made of stiff canvas or nylon so as to avoid being torn while picking fruit from thorny bushes and has a leather reinforcing panel 1a.

Near the upper end of the bag three holes 3a-3c are made through the bag material 1a. The holes 3a and 3c are dimensioned to receive the thumb and little finger respectively the hole 3b receives the remaining three fingers of the fruit pickers right hand. The holes 3a-3c are so disposed that on insertion of his fingers and thumb, the fruit picker does not unduly distort the bag shape. The portion of the bag between the holes 3b and 3c is folded back and retained in its folded form by means of a rivet R. The folding of that portion of the bag serves to prevent it cutting into the skin. FIG. 2 shows the harvesting bag with fingers and thumb inserted. As can be seen from the Figure, the holes 3a-3c locate close to the base of the fruit picker's fingers, leaving the outer ends of his fingers free to be manipulated in the bag entrance. A diagonal elastic strap 6 stitched to the bag holds the bag on the users hand. If desired the upper end of the strap 6 could be arranged above the little finger hole 3c and the lower end below the thumb hole 3a. The bag is tied to the fruit picker's forearm by an elasticated strap 4 stitched to the bag. The strap 4 may be replaced by two straps having at respective outer ends Velcro (RTM) patches which, on locating the straps about his forearm, the fruit picker presses together to retain the bag on his arm. The positions of the holes 3a and 3c can be reversed to enable the bag to be used on the left hand.

Referring to FIG. 3, the fruit picker utilises the harvesting bag, reaching up with that arm against which the bag is held and positions his hand and the bag relative to a fruit bush branch so that fruit when picked from the branch lies over the bag entrance and can be dropped into the bag. The frame 2, since it maintains the bag in an open position, offers little chance of fruit dropping to the ground. For fruit which requires only a gentle picking action to release it from the fruit tree, a high rate of harvesting can be achieved since a practised fruit picker can merely flick fruit direct from tree to bag. To further increase the rate of picking the picker can as shown in FIG. 3 use his other hand in the neighbourhood of the bag entrance.

The bag shown in FIG. 4 is intended for use on either the left hand or the right hand. The hand hold means comprise a row of three holes 3a-3c of which both holes 3a and 3c are large enough to accommodate the thumb. As in the bag of FIGS. 1 to 3, the hole 3b is larger than the other two and is intended for the three middle fingers of either hand. The hand hold means further includes a pair of crossed diagonal elastic straps 6 the ends of which are sewn to the outside of the bag.

In use the hand is inserted between the bag 1 and the straps from the direction indicated by the arrow 7 so that the fingers enter the holes and the straps cross at the back of the hand between the wrist and the fingers. A further elastic strap 8 is provided at the bottom of the bag; the user's hand is inserted under this strap 8 before passing under the straps 6, so that the strap 8 grips the forearm and holds the bag against it. Thus, the strap 8 replaces the straps 4 of the bag shown in FIG. 1. The bag is made from a tough, flexible plastics material, with portions 9 reinforced with leather.

In the bag shown in FIG. 5, the row of holes shown in FIG. 4 is replaced by a single wide hole 3' for all five fingers. The hand hold means further comprises a strap 6' one end of which is sewn to the outside of the bag below and to the right of the hole, and which passes through the hole with its other end sewn to the inside of the bag below the hole and near its left hand side, as shown in broken lines in the drawing. In use, the fingers of the right hand excluding the thumb are inserted under the strap in the direction of the arrow 7A so that they project through the hole, and the thumb is inserted through the hole above the strap as shown by arrow 7B. Thus the strap passes between the thumb and the first finger. The chute shown in FIG. 6 is for the right hand and has an array of five holes 3, one for each finger, of which the left hand hole 3" is for the thumb. The hand hold means also includes an elastic strap 6 on the outside of the chute which extends diagonally from the entrance between the thumb hole 3" and the adjacent finger hole, to a point below the right hand finger hole. In use, the hand is inserted under the strap 6 in the direction of the arrow 7 and each finger is inserted into its respective hole, so that when the chute is in position on the hand the strap passes across the back of the hand in the region of the base of the fingers. Instead of using five holes, the holes could be arranged as shown in FIGS. 1, 4 or 5.

The chute is used in conjunction with a larger conventional collecting bag (not shown) which may be hung from the harvester's shoulders, with the chute arranged to feed fruit into this larger bag.

Another form of harvesting bag according to the invention is smaller than the bags shown in FIGS. 1 to 5 and is intended for harvesting soft fruit such as strawberries which can easily bruise. The smaller bag has a capacity which prevents too much fruit being stored and reduces the risk of bruising. A larger bag can often result in the large amount of stored fruit becoming bruised and may tend to bump on the ground and damage any fruit therein. This latter disadvantage is particularly noticable when picking low growing fruit such as strawberries. The finger hole arrangement for the smaller bag is similar to that of the bag shown in FIG. 1. An elastic wrist strap may also be included.

A further form of harvesting bag according to the invention has no finger holes. Instead the hand hold means simply comprises an elastic strap secured at its ends to the bag near the entrance. In use, either hand is simply passed under the strap so that the strap passes between the thumb and first finger.

I claim:

1. A harvesting aid comprising a bag having an entrance, means to maintain the entrance in an open condition, and hand hold means operable, in use, to engage the harvester's hand while leaving the fingers and thumb free to move at the entrance, the hand-hold means comprising:
  (a) an array of holes in a side wall of the bag below the entrance, one of the holes being adapted to receive the thumb from the outside of the bag, and the remaining holes being adapted to receive the remaining fingers so that all of the fingers project into the bag; and
  (b) at least one strap on the outside of the bag arranged to grip the back of the hand when the hand is positioned between the strap and the bag with the fingers inserted in the holes.

2. A harvesting aid according to claim 1 wherein said strap extends diagonally across said array of holes and is secure at one end to a portion of said side wall near said thumb hole and at the other end to a portion of said side wall below the remaining holes.

3. A harvesting aid according to claim 2 wherein said hand hold means further comprises a second strap secured to said side wall and extending across said array of holes in a direction diagonally opposite to the first strap.

4. A harvesting aid according to claim 1 wherein said remaining holes comprise a small hole adapted to receive the little finger and an elongated central hole between the thumb hole and the small hole adapted to receive the three middle fingers.

5. A harvesting aid according to claim 4 wherein the portion of the side wall between the small hole and the central hole is folded to present a smooth, finished edge adapted to bear against the skin between the last two fingers and reduce the likelihood of irritation.

6. A harvesting aid according to claim 4 wherein said strap extends diagonally across said array of holes and is secured at one end to a portion of said side wall near said thumb hole and at the other end to a portion of said side wall below said small hole.

7. A harvesting aid according to claim 6 wherein said hand hold means further comprises a second strap extending across said array of holes in a direction diagonally opposite to the first strap, said second strap being secured at one end to a portion of said side wall near said small hole and at the other end to a portion of said side wall below said thumb hole.

8. A harvesting aid according to claim 1 wherein said strap is elastic.

9. A harvesting aid according to claim 1 wherein said side wall is reinforced with leather in the area of said array of holes, said holes extending through said leather reinforcement and said side wall.

10. A harvesting aid according to claim 1 further comprising securing means for securing a portion of the bag remote from the entrance to the harvester's arm to prevent the bag from swinging about the hand.

11. A harvesting aid comprising a chute having an upper entrance and a lower outlet, means to maintain the entrance in an open condition, and hand hold means operable, in use, to engage the harvester's hand while leaving the fingers and thumb free to move at the entrance, the hand-hold means comprising:
  (a) an array of holes in a side wall of the chute below the entrance, one of the holes being adapted to receive the thumb from the outside of the chute, and the remaining holes being adapted to receive the remaining fingers so that all of the fingers project into the chute; and
  (b) at least one strap on the outside of the chute arranged to grip the back of the hand when the hand is positioned between the strap and the chute with the fingers inserted into the holes.

12. A harvesting aid according to claim 11 wherein said strap extends diagonally across said array of holes and is secured at one end to a portion of said side wall near said thumb hole and at the other end to a portion of said side wall below the remaining holes.

13. A harvesting aid according to claim 12 wherein said hand hold means further comprises a second strap secured to said side wall and extending across said array of holes in a direction diagonally opposite to the first strap.

14. A harvesting aid according to claim 13 wherein said remaining holes comprise a small hole adapted to receive the little finger and an elongated central hole between the thumb hole and the small hole adapted to receive the three middle fingers.

15. A harvesting aid according to claim 14 wherein the portion of the side wall between the small hole and the central hole is folded to present a smooth, finished edge adapted to bear against the skin between the last two fingers and reduce the likelihood of irritation.

16. A harvesting aid according to claim 14 wherein said strap extends diagonally across said array of holes and is secured at one end to a portion of said side wall near said thumb hole and at the other end to a portion of said side wall below said small hole.

17. A harvesting aid according to claim 16 wherein said hand hold means further comprises a second strap extending across said array of holes in a direction diagonally opposite to the first strap, said second strap being secured at one end to a portion of said side wall near said small hole and at the other end to a portion of said side wall below said thumb hole.

18. A harvesting aid according to claim 13 wherein said remaining holes comprise four holes adapted to respectively receive the four remaining fingers.

19. A harvesting aid according to claim 18 wherein said strap extends diagonally across said array of holes and is secured at one end to a portion of said side wall near said thumb hole and at the other end to a portion of said side wall below the remaining holes.

20. A harvesting aid according to claim 13 wherein said strap is elastic.

21. A harvesting aid according to claim 13 wherein said side wall is reinforced with leather in the area of said array of holes, said holes extending through said leather reinforcement and said side wall.

22. A harvesting aid comprising a bag having an entrance, means to maintain the entrance in an open condition, and hand hold means operable, in use, to engage the harvester's hand while leaving the fingers and thumb free to move at the entrance, the hand-hold means comprising:
  (a) a single elongated hole in a side wall of the bag below the entrance through which hole all of the fingers can be inserted from outside the bag; and
  (b) a strap on the outside of the bag arranged to grip the back of the hand when the hand is positioned between the strap and the bag with the fingers inserted in the hole, said strap extending generally diagonally of said hole and being secured at one end to a portion of said side wall adjacent the lower edge of said hole a small distance from one end of said hole, and at the other end to a portion of said side wall near the opposite end of said hole, the strap adapted to pass between the thumb and index finger when the fingers are inserted into the hole.

23. A harvesting aid according to claim 22 wherein said one end of said strap is secured to the inside of said side wall adjacent the lower edge of said hole, said strap extending through said hole and across the outside of said bag.

24. A harvesting aid according to claim 22 wherein said strap is elastic.

25. A harvesting aid according to claim 22 wherein said side wall is reinforced with leather in the area of said hole, said hole extending through said leather reinforcement and said side wall.

26. A harvesting aid according to claim 22 further comprising securing means for securing a portion of the bag remote from the entrance to the harvester's arm to prevent the bag from swinging about the hand.

27. A harvesting aid comprising a chute having an upper entrance and a lower outlet, means to maintain the entrance in an open condition, and hand hold means operable, in use, to engage the harvester's hand while leaving the fingers and thumb free to move at the entrance, the hand-hold means comprising:
(a) a single, elongated hole in a side wall of the chute below the entrance through which hole all of the fingers can be inserted from outside the chute; and
(b) a strap on the outside of the chute arranged to grip the back of the hand when the hand is positioned between the strap and the chute with the fingers inserted in the hole, said strap extending generally diagonally of said hole and being secured at one end to a portion of said side wall adjacent the lower edge of said hole a small distance from one end of said hole, and at the other end to a portion of said side wall near the opposite end of said hole, the strap adapted to pass between the thumb and index finger when the fingers are inserted into the hole.

28. A harvesting aid according to claim 27 wherein said one end of said strap is secured to the inside of said side wall adjacent to lower edge of said hole, said strap extending through said hole and across the outside of said chute.

29. A harvesting aid according to claim 27 wherein said strap is elastic.

30. A harvesting aid according to claim 27 wherein said side wall is reinforced with leather in the area of said holes, said hole extending through said leather reinforcement and said side wall.

* * * * *